United States Patent

Lynch et al.

Patent Number: 5,827,966
Date of Patent: Oct. 27, 1998

[54] VIBRATORY ROTATION SENSOR UTILIZING LINEARIZED FLEXURE MEASURES

[75] Inventors: David D. Lynch; Anthony Matthews, both of Santa Barbara, Calif.

[73] Assignee: Litton Systems, Inc., Woodland Hills, Calif.

[21] Appl. No.: 865,364

[22] Filed: May 29, 1997

[51] Int. Cl.$^6$ .................................................. G01P 15/00
[52] U.S. Cl. ........................ 73/488; 73/504.02; 73/504.13
[58] Field of Search ................................ 73/488, 504.13, 73/504.12, 504.02, 504.03, 504.04, 503, 503.3; 74/5 R, 5.4

[56] References Cited

U.S. PATENT DOCUMENTS

| | | | |
|---|---|---|---|
| 3,719,074 | 3/1973 | Lynch | 73/504.13 |
| 4,157,041 | 6/1979 | Loper, Jr. et al. | 73/504.13 |
| 4,951,508 | 8/1990 | Loper, Jr. et al. | 73/504.13 |
| 5,712,427 | 1/1998 | Matthews | 73/504.04 |
| 5,760,304 | 6/1998 | Lynch | 73/504.13 |
| 5,763,780 | 6/1998 | Matthews et al. | 73/504.13 |

Primary Examiner—Hezron Williams
Assistant Examiner—Richard A. Moller
Attorney, Agent, or Firm—Robert E. Malm

[57] ABSTRACT

The invention is a method for obtaining linear measures of one or more parameters $p_m$ of a device having one or more input ports i and an output port where m takes on integer values from 1 to M, M being an integer equal to or greater than 1, and i takes on integer values from 1 to I, I being an integer equal to or greater than 1. The device causes one or more input signals $G_i(p_m)E_{ei}(t)$ fed into one or more input ports to be transformed into an output signal comprising a summation over i of $G_i(p_m)H_i(p_m)E_{oi}(t)$ at the output port. The function $G_i(p_m)$ is a weighting function associated with the i'th input port, $E_{ei}(t)$ is an excitation signal associated with the i'th input port, and $E_{oi}(t)$ is the transformation of the excitation signal $E_{ei}(t)$ that results from $E_{ei}(t)$ traversing the path from the input port i to the output port. The signals $E_{ei}(t)$ and $E_{oi}(t)$ are both independent of the parameter $p_m$. The product function $G_i(p_m)H_i(p_m)$ is representable by a power series of order $N_{im}$ in $p_m$, the value of $N_{im}$ depending on a specified accuracy of representation. The method comprising the steps (1) generating one or more linearizing weighting functions $G_{il}(p_m)$ for which the output signal is a linear measure of the parameter $p_m$ to the specified accuracy of representation, (2) feeding the input signals $G_{il}(p_m)E_{ei}(t)$ into the device; and (3) using a component of the output signal as a linear measure of each of the one or more parameters $p_m$.

8 Claims, 3 Drawing Sheets

VIBRATORY ROTATION SENSOR UTILIZING LINEARIZED FLEXURE MEASURES

BACKGROUND OF THE INVENTION

This invention relates generally to vibratory rotation sensors and more specifically to the electronics associated with such rotation sensors.

A prior-art vibratory rotation sensor (VRS) 10 consisting of an outer member 12, a hemispherical resonator 14, and an inner member 16, all made of fused quartz and joined together with indium, is shown unassembled in FIG. 1. The inertially-sensitive element is the thin-walled, 5.8-cm-diameter hemispherical resonator 14 positioned between the outer member 12 and the inner member 16 and supported by the stem 26.

A ring forcer electrode 20 and sixteen discrete forcer electrodes 22 are deposited on the interior surface of the outer member 12. In the assembled VRS 10, the ring forcer electrode 20 and the sixteen discrete forcer electrodes 22 are in close proximity to the exterior metalized surface 32 of the hemispherical resonator 14. In the assembled VRS, eight pickoff electrodes 24 deposited on the inner member 16 are in close proximity to the interior metalized surface 30 of the hemispherical resonator 14.

Capacitive forces can be exerted on the hemispherical resonator 14 by means of appropriate forcing voltage differences between the hemispherical resonator 14 and the ring forcer electrode 20 to cause the hemispherical resonator to vibrate in the lowest-order inextensional (or flexing) mode. A standing wave is established having four antinodes at 90-degree intervals about the circumference with four nodes offset by 45 degrees from the antinodes. The 0-degree and 180-degree antinodal points oscillate 90 degrees out of phase with 90-degree and the 270-degree antinodal points. The standing wave causes the shape of the rim of the hemispherical resonator to change from circular to elliptical (with semi-major axis through the 0-degree/180-degree antinodes) to circular to elliptical (with semi-major axis through the 90-degree/270-degree antinodes.

Rotation of the VRS 10 about an axis normal to the plane of the hemispherical-resonator rim 34 causes the standing wave to rotate in the opposite direction with respect to the VRS by an angle proportional to the angle of rotation of the VRS 10. Thus, by measuring the angle of rotation of the standing wave with respect to the VRS 10, one can determine the angle of rotation of the VRS 10.

The vibrational mode of the hemispherical resonator 14 is excited by placing a DC bias voltage on the hemispherical resonator 14 and an AC voltage on the ring forcer electrode 20, the frequency of the AC voltage being twice the resonant frequency of the hemispherical resonator 14.

The standing-wave pattern angle with respect to the VRS 10 is determined by measuring the currents that flow into and out of the pickoff electrodes 24 as the hemispherical resonator 14 vibrates and the capacitances of the pickoff electrodes 24 with respect to the hemispherical resonator vary. An x axis signal $I_x$ is obtained from the combination $I_0-I_{90}+I_{180}-I_{270}$ where the subscripts identify the angular orientations relative to the x axis of the electrodes from which the currents originate. Similarly, a y axis signal $I_y$ is obtained from the combination $I_{45}-I_{135}+I_{225}-I_{315}$. The tangent of twice the standing-wave pattern angle with respect to the 0-degree (i.e. x) axis is given by the ratio of $I_y$ to $I_x$.

As a result of nonuiiiformities in the thickness of the hemispherical resonator 14, the establishment of a first standing wave will lead to the development of a second standing wave oscillating in phase quadrature with antinodes coinciding with the nodes of the first standing wave. The development of a second standing wave can be inhibited by placing appropriate voltages on the sixteen discrete forcer electrodes 22.

A DC bias voltage is typically maintained on the hemispherical resonator 14 in order to reduce the magnitudes of the AC forcing voltages applied to the ring forcer electrode 20 and the discrete forcer electrodes 22 and to make the force exerted on the resonator a linear function of the AC driving voltages. The presence of the DC bias voltage results in slow changes in the electrical properties of the VRS which have been attributed to capacitance changes caused by charge-migration phenomena taking place at or within the outer member 12 and the inner member 16. These slow changes have resulted in an unacceptably large performance degradation over time and special means have to be provided to compensate for these effects.

SUMMARY OF THE INVENTION

The invention is a method. for obtaining linear measures of one or more parameters $p_m$ of a device having one or more input ports i and an output port where m takes on integer values from 1 to M, M being an integer equal to or greater than 1, and i takes on integer values from 1 to I, I being an integer equal to or greater than 1. The device causes one or more input signals $G_i(p_m)E_{ei}(t)$ fed into one or more input ports to be transformed into an output signal comprising a summation over i of $G_i(p_m)H_i(p_m)E_{oi}(t)$ at the output port. The function $G_i(p_m)$ is a weighting function associated with the i'th input port, $E_{ei}(t)$ is an excitation signal associated with the i'th input port, and $E_{oi}(t)$ is the transformation of the excitation signal $E_{ei}(t)$ that results from $E_{ei}(t)$ traversing the path from the input port i to the output port. The signals $E_{ei}(t)$ and $E_{ei}(t)$ are both independent of the parameter $p_m$. The product function $G_i(p_m)H_i(p_m)$ is representable by a power series of order $N_{im}$ in $p_m$, the value of $N_{im}$ depending on a specified accuracy of representation. The method comprises the steps (1) generating one or more linearizing weighting functions $G_{ii}(p_m)$ for which the output signal is a linear measure of the parameter $p_m$ to the specified accuracy of representation, (2) feeding the input signals $G_{ii}(p_m)E_{ei}(t)$ into the device; and (3) using a component of the output signal as a linear measure of each of the one or more parameters $p_m$.

In a particular implementation of the method, $G_{ii}(p_m)$ is obtained by setting $G_{ii}(p_m)H_i(p_m)$ equal to $A_i p_m$ where $A_i$ is an arbitrary constant.

In applying the method to a vibratory rotation sensor, the device becomes a vibratory rotation sensor comprising a resonator with attached resonator electrode and a housing with a plurality of attached housing electrodes. Each of the housing electrodes corresponds to an input port and the resonator electrode corresponds to the output port. The linearizing weighting function associated with a particular port i is $G_{ii}(z_i)$ where the quantity $(1+z_i)$ is the distance between the resonator electrode and the i'th housing electrode in units of the distance between the same electrodes when the resonator is not vibrating. The linearizing weighting function $G_{ii}(z_i)$ associated with a particular port i is proportional to $z_i(1+z_i)$. In an alternative configuration, the linearizing weighting function $G_{ii}(z_i)$ associated with a particular port i is proportional to $(1-z_i)(1+z_i)$.

The parameter $z_i$ is calculated from the maximum flexing amplitudes $d_i$ and $d_q$ of the inphase and quadrature vibration modes respectively expressed in the same units as $z_i$, the angle $\theta$ between the antinodal axis of the inphase standing wave with respect to the $z_i$ electrode position, the angular frequency of vibration $\omega$ of the resonator, and the phase angle $\phi$ associated with the vibration of the resonator. Estimates of $d_i$, $d_q$, $\theta$, $\omega$, and $\phi$ are provided by the vibratory rotation sensor.

In the whole-angle-tracking mode, the value of the maximum quadrature flexing amplitude $d_q$ can be set equal to zero in calculating $z_i$ and still realize a satisfactory representational accuracy of the output signal taken as a linear representation of $z_i$. An additional simplification can be obtained by approximating $\cos(\omega t+\phi)$ by a constant $\gamma$ in calculating $z_i$.

DESCRIPTION OF THE PREFERRED EMBODIMENTS

An embodiment of the invention as part of a vibratory rotation sensor for which the control and readout is accomplished with multiplexed signals is described in this section. The vibratory rotation sensor consists of a resonator, a housing to which the resonator is attached, and multiplex electronics. The resonator can be any rotationally-symmetric thin-walled object having standing-wave vibration modes. The prior art typically suggests that the resonator be hemispherical in shape.

Figure 1:
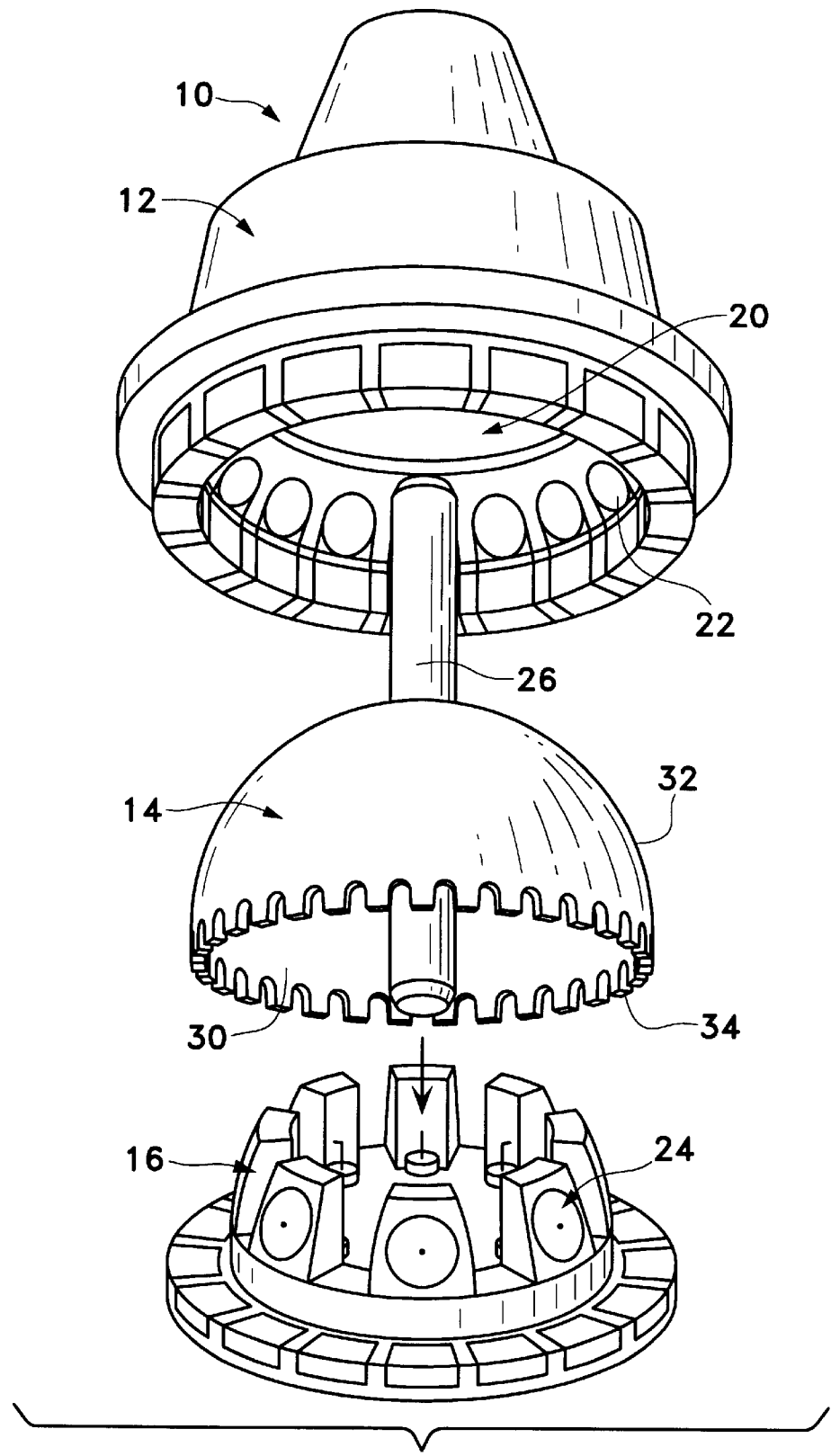
FIG. 1 shows the structure of a prior-art vibratory rotation sensor.
Figure 2:
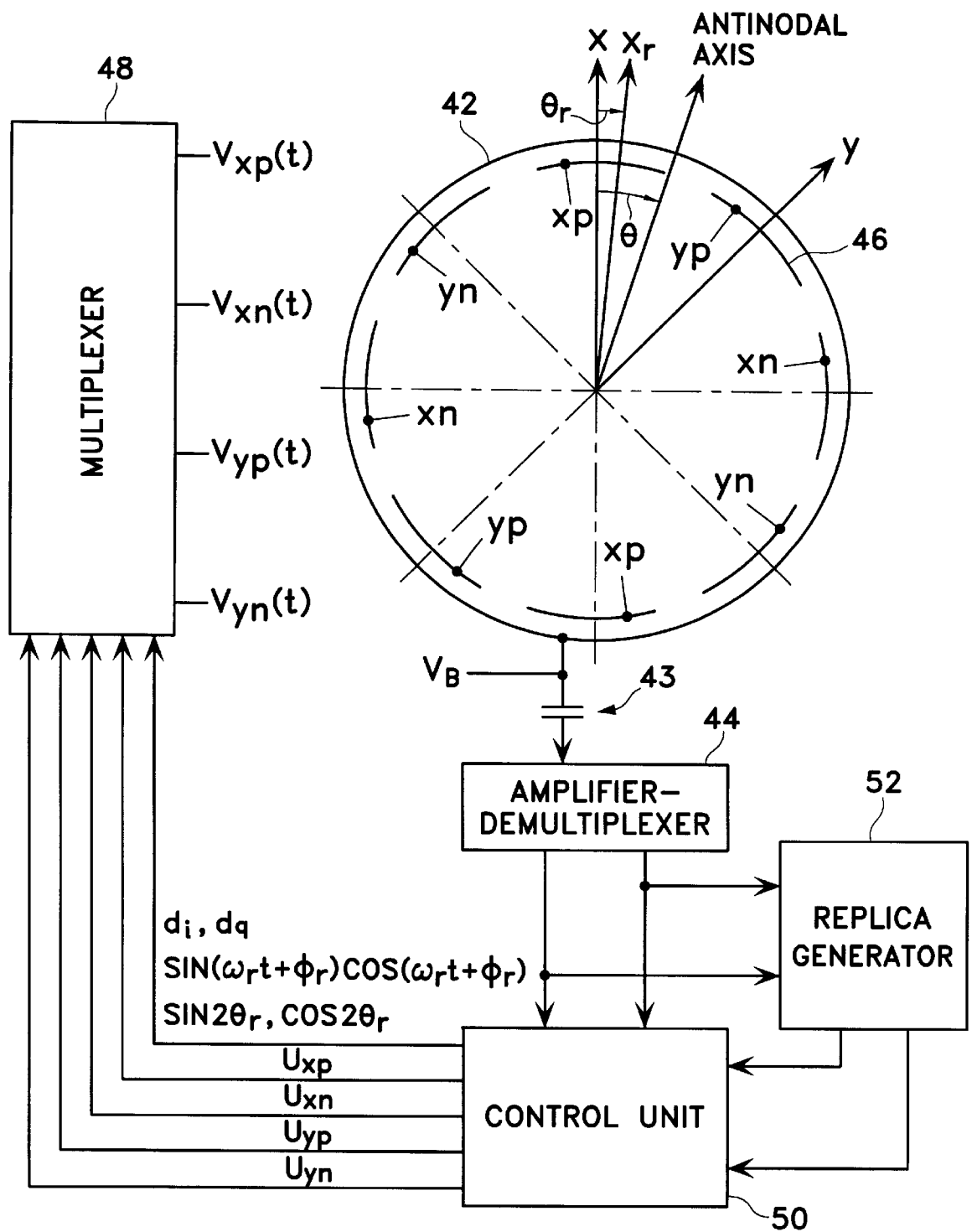
FIG. 2 shows a block diagram of the control and readout electronics for the invention.

A simplified method for determining the parameters of the standing waves and controlling the dynamics of the resonator is illustrated in FIG. 2. The standing waves are describable with respect to x and y axes fixed with respect to the resonator. The orientation of the inphase standing wave with respect to the resonator can be specified by the orientation angle $\theta$ of an inphase antinodal axis measured clockwise from the x axis. The deviation of the resonator rim from a circle along the inphase antinodal axis is assumed to vary as $\cos(\omega t+\phi)$ where $\omega$ is the vibration frequency, t is time, and $\phi$ is an arbitrary phase angle. The orientation of the quadrature standing wave with respect to the resonator is specified by the orientation angle $\theta+\pi/4$ of a quadrature antinodal axis measured clockwise from the x axis. The deviation of the resonator rim from a circle along the quadrature antinodal axis is assumed to vary as $\sin(\omega t+\phi)$.

The circumferentially-continuous resonator electrode 42, deposited on the interior surface of the resonator, is biased to a DC voltage $V_B$ and is connected through a DC-blocking capacitor 43 to the amplifier-demultiplexer 44. Eight electrodes 46 attached to the VRS housing are equally spaced about the circumference in close proximity to the resonator electrode 42, the uppermost xp electrode being centered on the x-axis. The eight electrodes 46 are supplied with the driving voltages $V_{xp}(t)$, $V_{xn}(t)$, $V_{yp}(t)$, and $V_{yn}(t)$ from the multiplexer 48 where $$V_{xp}(t) = G_{xp}(x)[V_{mxr}(t)\cos 2\theta_r \cos(\omega_{xr} t + \psi_{xr}) - \quad (1)$$
$$V_{myr}(t)\sin 2\theta_r \cos(\omega_{yr} t + \psi_{yr})] + V_{cx}(t)U_{xp}(t)$$

-continued
$$V_{xn}(t) = -G_{xn}(x)[V_{mxr}(t)\cos 2\theta_r \cos(\omega_{xr} t + \psi_{xr}) -$$
$$V_{myr}(t)\sin 2\theta_r \cos(\omega_{yr} t + \psi_{yr})] + V_{cx}(t)U_{xn}(t)$$
$$V_{yp}(t) = G_{yp}(y)[V_{mxr}(t)\sin 2\theta_r \cos(\omega_{xr} t + \psi_{xr}) +$$
$$V_{myr}(t)\cos 2\theta_r \cos(\omega_{yr} t + \psi_{yr})] + V_{cy}(t)U_{yp}(t)$$
$$V_{yn}(t) = -G_{yn}(y)[V_{mxr}(t)\sin 2\theta_r \cos(\omega_{xr} t + \psi_{xr}) +$$
$$V_{myr}(t)\cos 2\theta_r \cos(\omega_{yr} t + \psi_{yr})] + V_{cy}(t)U_{yn}(t)$$

The excitation voltages $V_{mxr}(t)\cos(\omega_{xr} t+\psi_{xr})$ and $V_{myr}(t)\cos(\omega_{yr} t+\psi_{yr})$ are components in the $x_r$-$y_r$ tracking-angle coordinate system of FIG. 2 (denoted by the r in the subscripts). The preferred embodiments of the excitation voltages include the sinusoids $\cos(\omega_{xr} t+\psi_{xr})$ and $\cos(\omega_{yr} t+\psi_{yr})$. There are a variety of periodic functions $F(\omega_{xr} t+\psi_{xr})$ which may be utilized instead of the sinusoids including ordinary square waves.

The weighting functions $G_{xp}(x)$, $G_{xn}(y)$, $G_{yp}(x)$, and $G_{yn}(y)$ are functions of x and y where x and y are the flexing amplitudes of the resonator electrode 42 at the xp and yp electrode positions respectively divided by the gap between the resonator electrode 42 and the electrodes 46 when the resonator is not excited. Positive x or y values are associated with gaps that are larger than the non-excited gap, and negative x or y values are associated with gaps that are smaller. The reasons for the presence of these functions will be discussed later.

The $x_r$-axis is rotated clockwise from the x-axis by the tracking angle $\theta_r$. The excitation voltages are designed not to affect the parameters of a standing wave on the resonator. The angular frequencies $\omega_{xr}$ and $\omega_{yr}$ and phases $\psi_{xr}$ and $\psi_{yr}$ depend on the type of multiplexing being used. The forcing voltages $V_{cx}(t)U_{xp}(t)$, $V_{cx}(t)U_{xn}(t)$, $V_{cy}(t)U_{yp}(t)$, and $V_{cy}(t)U_{yn}(t)$ (expressed as components in the x-y coordinate system) cause forces to be applied to the resonator for the purpose of controlling the parameters of the one or more standing waves on the resonator. The functions $U_{xp}(t)$, $U_{xn}(t)$, $U_{yp}(t)$, and $U_{yn}(t)$ are generated by control unit 50 and supplied to multiplexer 48. The voltages $V_{cx}(t)$ and $V_{cy}(t)$ are predetermined functions used to isolate the forcing voltages from the excitation voltages.

The current I(t) flowing from the resonator electrode 42 into the amplifier-demultiplexer 44 is given by $$I(t)=I_{xp}(t)+I_{xn}(t)+I_{yp}(t)+I_{yn}(t) \quad (2)$$

where $$I_{xp}(t) = K_I G_{xp}(x) C_{xp}[V_{mxr}(t)\omega_{xr}\cos 2\theta_r \cos(\omega_{xr} t + \psi_{xr}) - \quad (3)$$
$$V_{myr}(t)\omega_{yr}\sin 2\theta_r \cos(\omega_{yr} t + \psi_{yr})] +$$
$$K_I C_{xp} V_{cx}(t)\omega U_{xp} U_{xp}(t)$$
$$I_{xn}(t) = -K_I G_{xn}(x) C_{xn}[V_{mxr}(t)\omega_{xr}\cos 2\theta_r \cos(\omega_{xr} t + \psi_{xr}) -$$
$$V_{myr}(t)\omega_{yr}\sin 2\theta_r \cos(\omega_{yr} t + \psi_{yr})] +$$
$$K_I C_{xn} V_{cx}(t)\omega U_{xn} U_{xn}(t)$$
$$I_{yp}(t) = K_I G_{yp}(y) C_{yp}[V_{mxr}(t)\omega_{xr}\sin 2\theta_r \cos(\omega_{xr} t + \psi_{xr}) +$$
$$V_{myr}(t)\omega_{yr}\cos 2\theta_r \cos(\omega_{yr} t + \psi_{yr})] +$$
$$K_I C_{yp} V_{cy}(t)\omega U_{yp} U_{yp}(t)$$
$$I_{yn}(t) = -K_I G_{yn}(y) C_{yn}[V_{mxr}(t)\omega_{xr}\sin 2\theta_r \cos(\omega_{xr} t + \psi_{xr}) +$$
$$V_{myr}(t)\omega_{yr}\cos 2\theta_r \cos(\omega_{yr} t + \psi_{yr})] +$$
$$K_I C_{yn} V_{cy}(t)\omega U_{yn} U_{yn}(t)$$

The capacitances $C_{xp}$, $C_{xn}$, $C_{yp}$, and $C_{yn}$ are the capacitances of the xp, xn, yp, and yn electrodes 46 with respect to the resonator electrode 42. The angular frequencies $\omega_{Uxp}$, $\omega_{Uxn}$, $\omega_{Uyp}$, and $\omega_{Uyn}$ are those associated with the corresponding U's and are typically equal to or less than 2$\omega$ where $\omega$ is the resonator vibration frequency. The symbol $K_1$ denotes a constant. The phase differences between the driving voltages and the resulting currents are of no relevance and have been ignored in the equations above.

The capacitances are given by $$C_{xp} = C_o(1-x)/(1-x^2)$$

$$C_{xn} = C_o(1+x)/(1-x^2)$$

$$C_{yp} = C_o(1-y)/(1-y^2)$$

$$C_{yn} = C_o(1+y)/(1-y^2) \tag{4}$$

The quantity $C_o$ is the capacitance of the electrode pairs when the resonator is not excited, and x, y, −x, and −y are the flexing amplitudes of the resonator electrodes 42 at the xp, yp, xn, and yn electrode positions respectively divided by the gap between the resonator electrode 42 and the electrodes 46 when the resonator is not excited.

Substituting for the capacitances in the current equations, we obtain $$\begin{aligned} I_{xp}(t) = & \; K_I C_o \frac{G_{xp}(x)}{1+x} [V_{mxr}(t)\omega_{xr}\cos 2\theta_r \cos(\omega_{xr}t + \psi_{xr}) - \\ & V_{myr}(t)\omega_{yr}\sin 2\theta_r \cos(\omega_{yr}t + \psi_{yr})] + \\ & K_I C_{xp} V_{cx}(t)\omega_{Uxp} U_{xp}(t) \end{aligned} \tag{5}$$

$$\begin{aligned} I_{xn}(t) = & \; -K_I C_o \frac{G_{xn}(x)}{1-x} [V_{mxr}(t)\omega_{xr}\cos 2\theta_r \cos(\omega_{xr}t + \psi_{xr}) - \\ & V_{myr}(t)\omega_{yr}\sin 2\theta_r \cos(\omega_{yr}t + \psi_{yr})] + \\ & K_I C_{xn} V_{cx}(t)\omega_{Uxn} U_{xn}(t) \end{aligned}$$

$$\begin{aligned} I_{yp}(t) = & \; K_I C_o \frac{G_{yp}(y)}{1+y} [V_{mxr}(t)\omega_{xr}\sin 2\theta_r \cos(\omega_{xr}t + \psi_{xr}) + \\ & V_{myr}(t)\omega_{yr}\cos 2\theta_r \cos(\omega_{yr}t + \psi_{yr})] + \\ & K_I C_{yp} V_{cy}(t)\omega_{Uyp} U_{yp}(t) \end{aligned}$$

$$\begin{aligned} I_{yn}(t) = & \; -K_I C_o \frac{G_{yn}(y)}{1-y} [V_{mxr}(t)\omega_{xr}\sin 2\theta_r \cos(\omega_{xr}t + \psi_{xr}) + \\ & V_{myr}(t)\omega_{yr}\cos 2\theta_r \cos(\omega_{yr}t + \psi_{yr})] + \\ & K_I C_{yn} V_{cy}(t)\omega_{Uyn} U_{yn}(t) \end{aligned}$$

The determination of the standing wave parameters is simplified if the currents are linear functions of x and y. This result can be achieved by defining the G functions as follows:

$$G_{xp} = x(1+x)$$

$$G_{xn} = x(1-x)$$

$$G_{yp} = y(1+y)$$

$$G_{yn} = y(1-y) \tag{6}$$

It may be preferable to use only two G factors where $$G_x(x) = G_{xp}(x) = G_{xn}(x)$$

$$G_y(y) = G_{yp}(y) = G_{yn}(y) \tag{7}$$

The sum of the currents then becomes $$\begin{aligned} I(t) = & \; K_I C_o \frac{(-2x)G_x(x)}{1-x^2} [V_{mxr}(t)\omega_{xr}\cos 2\theta_r \cos(\omega_{xr}t + \psi_{xr}) - \\ & V_{myr}(t)\omega_{yr}\sin 2\theta_r \cos(\omega_{yr}t + \psi_{yr})] + \\ & K_I C_{xp} V_{cx}(t)\omega_{Uxp} U_{xp}(t) + \\ & K_I C_{xn} V_{cx}(t)\omega_{Uxn} U_{xn}(t) + \\ & K_I C_o \frac{(-2y)G_y(y)}{1-y^2} [V_{mxr}(t)\omega_{xr}\sin 2\theta_r \cos(\omega_{xr}t + \psi_{xr}) + \\ & V_{myr}(t)\omega_{yr}\cos 2\theta_r \cos(\omega_{yr}t + \psi_{yr})] + \\ & K_I C_{yp} V_{cy}(t)\omega_{Uyp} U_{yp}(t) + \\ & K_I C_{yn} V_{cy}(t)\omega_{Uyn} U_{yn}(t) \end{aligned} \tag{8}$$

Here, we can obtain the desired linear relationships by defining the G functions as follows:

$$G_x(x) = -(1-x^2)$$

$$G_y(y) = -(1-y^2) \tag{9}$$

The sum of the currents I(t) is then given by $$\begin{aligned} I(t) = & \; 2K_I C_o x [V_{mxr}(t)\omega_{xr}\cos 2\theta_r \cos(\omega_{xr}t + \psi_{xr}) - \\ & V_{myr}(t)\omega_{yr}\sin 2\theta_r \cos(\omega_{yr}t + \psi_{yr})] + \\ & K_I C_{xp} V_{cx}(t)\omega_{Uxp} U_{xp}(t) + \\ & K_I C_{xn} V_{cx}(t)\omega_{Uxn} U_{xn}(t) + \\ & 2K_I C_o y [V_{mxr}(t)\omega_{xr}\sin 2\theta_r \cos(\omega_{xr}t + \psi_{xr}) + \\ & V_{myr}(t)\omega_{yr}\cos 2\theta_r \cos(\omega_{yr}t + \psi_{yr})] + \\ & K_I C_{yp} V_{cy}(t)\omega_{Uyp} U_{yp}(t) + \\ & K_I C_{yn} V_{cy}(t)\omega_{Uyn} U_{yn}(t) \end{aligned} \tag{10}$$

The linearization process described above as applied to vibratory rotation sensors can be generalized in the following way. Let us assume a device having one or more input ports and an output port which transforms an input signal $G_i(p_m)E_{ei}(t)$ into an output signal consisting of the summation over i of the signals $G_i(p_m)H_i(p_m)E_{eo}(t)$. The index i takes on integer values from 1 to I which identify I input ports. The symbol $p_m$ denotes the m'th of M parameters which characterize the operation of the device and/or the environment in which it operates. The signal $E_{ei}(t)$ is the excitation signal associated with the i'th input port. The signal $E_{oi}(t)$ is the transformation of the excitation signal $E_{ei}(t)$ that results from $E_{ei}(t)$ traversing the path from the input port i to the output port. The function $G_i(p_m)$ is the weighting function associated with the i'th input port. The function $H_i(p_m)$ describes the functional dependence on $p_m$ of the transformation of the input signal at the i'th input port to the output port. The transformation of the input signal into the output signal provides a means for obtaining a measure $G_i(p_m)H_i(p_m)$ of $p_m$.

Let us postulate that $G_i(p_m)H_i(p_m)$ can be represented by a power series of order $N_{im}$ in $p_m$ where $N_{im}$ depends on a specified accuracy of representation. A linearizing weighting function $G_{il}(p_m)$ is one which results in $G_{il}(p_m)H_i(p_m)$ being a linear measure of $p_m$ to within the specified accuracy of representation.

The linearizing weighting function $G_{il}(p_m)$ can be obtained from the equation $$G_{il}(p_m) = \frac{A_{im}p_m}{H_i(p_m)} \tag{11}$$

where $A_{im}$ is an arbitrary constant.

In the case of the vibratory rotation sensor discussed above, assume that the xp electrode is the input port and the resonator electrode is the output port. Then $$E_{exp}(t) = [V_{mxr}(t)\cos2\theta_r\cos(\omega_{xr}t + \psi_{xr}) - V_{myr}(t)\sin2\theta_r\cos(\omega_{yr}t + \psi_{yr})] \quad (12)$$

$$E_{oxp}(t) = [V_{mxr}(t)\omega_{xr}\cos2\theta_r\cos(\omega_{xr}t + \psi_{xr}) -$$

$$V_{myr}(t)\omega_{yr}\sin2\theta_r\cos(\omega_{yr}t + \psi_{yr})]$$

$$H_{xp}(x) = K_I C_o \frac{1}{1+x}$$

$$G_{xp}(x) = x(1+x)$$

$$A_{xp} = K_I C_o$$

If the input port to the vibratory rotation sensor feeds the xp electrode directly and the xn electrode through an inverter, then $$E_{exp}(t) = [V_{mxr}(t)\cos2\theta_r\cos(\omega_{xr}t + \psi_{xr}) - V_{myr}(t)\sin2\theta_r\cos(\omega_{yr}t + \psi_{yr})] \quad (13)$$

$$E_{oxp}(t) = [V_{mxr}(t)\omega_{xr}\cos2\theta_r\cos(\omega_{xr}t + \psi_{xr}) -$$

$$V_{myr}(t)\omega_{yr}\sin2\theta_r\cos(\omega_{yr}t + \psi_{yr})]$$

$$H_{xpn}(x) = -K_I C_o \frac{x}{1-x^2}$$

$$G_{xpn}(x) = (1 - x^2)$$

$$A_{xpn} = -K_I C_o$$

The quantities x and y are expressed in terms of the vibration mode parameters by the equations $$x = d_i \cos 2\theta \cos(\omega t + \phi) - d_q \sin 2\theta \sin(\omega t + \phi)]$$

$$y = d_i \sin 2\theta \cos(\omega t + \phi) + d_q \cos 2\theta \sin(\omega t + \phi)] \quad (14)$$

The quantities $d_i$ and $d_q$ are the maximum flexing amplitudes respectively of the inphase and quadrature modes divided by the gap between the resonator electrode 42 and the electrodes 46 when the resonator is not excited, $\theta$ is the angle between the antinode of the inphase standing wave and the x-axis, $\omega$ is the angular frequency of vibration of the resonator, and $\phi$ is an arbitrary phase angle.

The quantities x and y are not directly available in the vibratory rotation sensor, but can be determined from the equations above. Since the quantity $d_q$ is maintained near zero, x and y can also be approximated by the first terms in the expressions above. In the whole-angle-tracking mode, the tracking angle $\theta_r$ is maintained nearly equal to $\theta$. Consequently, $\theta_r$ can be substituted for $\theta$ in the equations above. These approximations to x and y generally result in an output signal that includes components that can be taken as linear representations of x and y with an acceptable accuracy of representation.

A further approximation is to use only the first terms in the equations above and replace the quantity $\cos(\omega t + \phi)$ by a constant $\gamma$. Analysis shows that a value of $(3/4)^{1/2}$ for $\gamma$ will provide adequate accuracy.

Substituting the above expressions for x and y in the I(t) equation (10), we obtain $$\begin{aligned} I(t) = & 2K_I C_o V_{mxr}(t)\omega_{xr}\cos(\omega_{xr}t + \psi_{xr})[d_i\cos(2\theta - 2\theta_r)\cos(\omega t + \phi) - \\ & d_q\sin(2\theta - 2\theta_r)\sin(\omega t + \phi)] + \\ & K_I C_{xp} V_{cx}(t)\omega_{Uxp} U_{xp}(t) + K_I C_{xn} V_{cx}(t)\omega_{Uxn} U_{xn}(t) + \\ & 2K_I C_o V_{myr}(t)\omega_{yr}\cos(\omega_{yr}t + \psi_{yr})[d_i\sin(2\theta - 2\theta_r)\cos(\omega t + \phi) + \\ & d_q\cos(2\theta - 2\theta_r)\sin(\omega t + \phi)] + \\ & K_I C_{yp} V_{cy}(t)\omega_{Uyp} U_{yp}(t) + K_I C_{yn} V_{cy}(t)\omega_{Uyn} U_{yn}(t) \end{aligned} \quad (15)$$

The current I(t) is transformed into the voltage V(t) by the amplifier-demultiplexer 44:

$$V(t) = K_V[V_x(t)R_x(t) + V_y(t)R_y(t)] + K_F[F_x(t) + F_y(t)] \quad (16)$$

where $K_V$ and $K_F$ are constants, $$V_x(t) = V_{mxr}(t)\omega_{xr}\cos(\omega_{xr}t + \psi_{xr}) \quad (17)$$

$$V_y(t) = V_{myr}(t)\omega_{yr}\cos(\omega_{yr}t + \psi_{yr})$$

$$R_x(t) = d_i\cos(2\theta - 2\theta_r)\cos(\omega t + \phi) - d_q\sin(2\theta - 2\theta_r)\sin(\omega t + \phi)$$

$$R_y(t) = d_i\sin(2\theta - 2\theta_r)\cos(\omega t + \phi) + d_q\cos(2\theta - 2\theta_r)\sin(\omega t + \phi)$$

and $$F_x(t) = V_{cx}(t)[\omega_{Uxp} U_{xp}(t) C_{xp} + \omega_{Uxn} U_{xn}(t) C_{xn}] \quad (18)$$

$$F_y(t) = V_{cy}(t)[\omega_{Uyp} U_{yp}(t) C_{yp} + \omega_{Uyn} U_{yn}(t) C_{yn}]$$

The signals $R_x(t)$ and $R_y(t)$ are the desired outputs from a demultiplexing process applied to V(t) since they contain the standing wave parameters $d_i$, $d_q$, $\theta - \theta_r$, $\omega$, and $\phi$.

Signals $S_x(t)$ and $S_y(t)$ containing the signals $R_x(t)$ and $R_y(t)$ are extracted by amplifier-demultiplexer 44. The operating principle of the demultiplexer portion of the amplifier-demultiplexer 44 depends on the form of the voltages $V_{mxr}(t)$, $V_{myr}(t)$, $V_{cx}(t)$, and $V_{cy}(t)$ and the values of $\omega_{xr}$, $\omega_{yr}$, $\psi_{xr}$, and $\psi_{yr}$.

For frequency-divisionl multiplexing, $V_{mxr}(t)$, $V_{myr}(t)$, $V_{cx}(t)$, and $V_{cy}(t)$ are all equal to a constant, $\omega_{xr}$, $\omega_{yr}$, and $|\omega_{xr} - \omega_{yr}|$ are greater than about 6 $\omega$, and $\psi_{xr}$, and $\psi_{yr}$ are arbitrary constants. The signals $R_x(t)$ and $R_y(t)$ which contain the standing-wave parameters are obtained by performing two product demodulations of V(t), one with respect to $\cos(\omega_{xr}t + \psi_{xr})$ and the other with respect to $\cos(\omega_{xr}t + \psi_{yr})$. If a periodic function other than a sinusoid is being used, then the demodulations proceed using replicas of the periodic functions. A product demodulation consists of multiplying the input voltage by the reference sinusoid (or replica) and lowpass filtering the product, the cutoff frequency of the lowpass filter being about 3 $\omega$. The results of the above process are the signals $S_{FDMx}(t)$ and $S_{FDMy}(t)$:

$$S_{FDMx}(t) = K_{FDM} R_x(t)$$

$$S_{FDMy}(t) = K_{FDM} R_y(t) \quad (19)$$

where $K_{FDM}$ is a constant. Because the upper limit to the frequency spectrums of $F_x(t)$ and $F_y(t)$ are about 3 $\omega$, these quantities are eliminated by the demultiplexing process.

For phase-division multiplexing, $\omega_{xr}$ and $\omega_{yr}$ have the same value $\omega_o$, $\omega_o$ being greater than about 6 $\omega$, and $\psi_{xr} - \psi_{yr}$ is equal to $\pi/2$ radians. The signals $S_{PDMx}(t)$ and $S_{PDMy}(t)$ are obtained by performing product demodulations of V(t) with respect to $\cos(\omega_o t + \psi_x)$ and with respect to $\cos(\omega_o t + \psi_x)$ (or with respect to replicas of the periodic functions being used).

$$S_{PDMx}(t) = K_{PDM} R_x(t)$$

$$S_{PDMy}(t) = K_{PDM} R_y(t) \quad (20)$$

where $K_{PDM}$ is a constant.

For one form of time-division multiplexing, $\omega_{xr}$ and $\omega_{yr}$ have the same value $\omega_o$ with $\omega_o$ being greater than about 6 $\omega$ and $\psi_{xr}$, and $\psi_{yr}$ are equal to an arbitrary number $\psi_o$. The voltages $V_{mxr}(t)$ and $V_{myr}(t)$ are proportional to square waves which take on values of 0 and 1, only one of which being equal to 1 at any given time and the duration of a "1" value being equal to an integer times $2\pi/\omega$. The voltages $V_{cx}(t)$, and $V_{cy}(t)$ are both equal to a constant. The signals $S_{TDMx}(t)$ and $S_{TDMy}(t)$ are obtained by performing a product demodulation of V(t) with respect to cos ($\omega_o t+\psi_o$) (or replica) followed by parallel multiplications with $V_{mxr}(t)$ and $V_{myr}(t)$:

$$S_{TDMx}(t) = K_{TDM} V_{mxr}(t) R_x(t)$$

$$S_{TDMy}(t) = K_{TDM} V_{myr}(t) R_y(t) \quad (21)$$

where $K_{TDM}$ is a constant. It should be noted that $R_x(t)$ and $R_y(t)$ are available only when $V_{mxr}(t)$ and $V_{myr}(t)$ are non-zero.

The same results are obtained (except possibly for the value of the constant $K_{TDM}$) if $V_{mxr}(t)$, $V_{myr}(t)$, $V_{cx}(t)$, and $V_{cy}(t)$ are proportional to square waves which take on values of 0 and 1, only one of the square waves being equal to 1 at any given time and the duration of a "1" value being equal to an integer times $2\pi/\omega$. This mode of operation may be desirable in that it completely isolates the forcing voltages $V_{cx}(t)U_{xp}(t)$, $V_{cx}(t)U_{xn}(t)$, $V_{cy}(t)U_{yp}(t)$, and $V_{cy}(t)U_{yn}(t)$ from each other and from the excitation voltages $V_{mxr}(t)$ cos ($\omega_o t+\psi_o$) and $V_{myr}(t)$ cos ($\omega_o t+\psi_o$).

For another form of time-division multiplexing, $\omega_o$ equals 0 and $V_{mxr}(t)$, $V_{myr}(t)$, $V_{cx}(t)$, and $V_{cy}(t)$ are proportional to square waves which take on values of 0 and 1, only one of the square waves being equal to 1 at any given time and the duration of a "1" value being equal to an integer times $2\pi/\omega$. Multiplying V(t) in parallel operations by $V_{mxr}(t)$ and by $V_{myr}(t)$ gives the same results as in the first form of time-division multiplexing.

For code-division multiplexing, $\omega_{xr}$, $\omega_{yr}$, $\psi_{xr}$, and $\psi_{yr}$ are all equal to 0, $V_{cx}(t)$, and $V_{cy}(t)$ are constants, and $V_{mxr}(t)$ and $V_{myr}(t)$ are proportional to square waves which take on pseudo-random sequences of values of $-1/T$ and $1/T$ and satisfy the following conditions:

$$\int_T V_i V_j dt = \begin{cases} 1; i=j \\ 0; i \neq j \end{cases} \quad (22)$$

where the subscripts i and j stand for any of the subscripts mxr, myr, cx, and cy. The integration time interval T should be less than $2\pi/3\omega$. The signals $S_{CDMx}(t)$ and $S_{CDMy}(t)$ are obtained by separately multiplying V(t) by $V_{mxr}(t)$ and $V_{myr}(t)$ and then integrating over T:

$$S_{CDMx}(nT) = K_{CDM} R_x(nT)$$

$$S_{CDMy}(nT) = K_{CDM} R_y(nT) \quad (23)$$

where $K_{TDM}$ is a constant and n is an integer. It should be noted that the signals $S_{CDMx}(t)$ and $S_{CDMy}(t)$ provide information concerning the standing-wave parameters at intervals of T.

The voltages $U_x(t)$ and $U_y(t)$ typically may include three components:

$$U_{xp}(t) = U_{axp}(t) + U_{qxp}(t) + U_{rxp}(t) \quad (24)$$

$$U_{xn}(t) = U_{axn}(t) + U_{qxn}(t) + U_{rxn}(t)$$

$$U_{yp}(t) = U_{ayp}(t) + U_{qyp}(t) + U_{ryp}(t)$$

$$U_{yn}(t) = U_{ayn}(t) + U_{qyn}(t) + U_{ryn}(t)$$

where the subscripts a, q, and r identify the amplitude, quadrature and rate control voltages. It is not necessary to isolate these components from one another in all applications. However, if isolation is desired, the following substitutions can be made in the foregoing equations.

$$V_{cax}(t)U_{axp}(t) + V_{cqx}(t)U_{qxp}(t) + V_{crx}(t)U_{rxp}(t) \text{ for } V_{cx}(t)U_{xp}(t) \quad (25)$$

$$V_{cax}(t)U_{axn}(t) + V_{cqx}(t)U_{qxn}(t) + V_{crx}(t)U_{rxn}(t) \text{ for } V_{cx}(t)U_{xn}(t)$$

$$V_{cay}(t)U_{ayp}(t) + V_{cqy}(t)U_{qyp}(t) + V_{cry}(t)U_{ryp}(t) \text{ for } V_{cy}(t)U_{yp}(t)$$

$$V_{cay}(t)U_{ayn}(t) + V_{cqy}(t)U_{qyn}(t) + V_{cry}(t)U_{ryn}(t) \text{ for } V_{cy}(t)U_{yn}(t)$$

With these substitutions, any constraints imposed on $V_{cx}(t)$ and $V_{cy}(t)$ also apply to $V_{cax}(t)$, $V_{cqx}(t)$, $V_{crx}(t)$, $V_{cay}(t)$, $V_{cqy}(t)$, and $V_{cry}(t)$. For example, equations (1) become $$\begin{aligned} V_{xp}(t) = & \; G_{xp}(x) [V_{mxr}(t)\cos 2\theta_r \cos(\omega_{xr} t + \psi_{xr}) - \\ & V_{myr}(t)\sin 2\theta_r \cos(\omega_{yr} t + \psi_{yr})] + V_{cax}(t)U_{axp}(t) + \\ & V_{cqx}(t)U_{qxp}(t) + V_{crx}(t)U_{rxp}(t) \end{aligned} \quad (26)$$

$$\begin{aligned} V_{xn}(t) = & -G_{xn}(x)[V_{mxr}(t)\cos 2\theta_r \cos(\omega_{xr} t + \psi_{xr}) + \\ & V_{myr}(t)\sin 2\theta_r \cos(\omega_{yr} t + \psi_{yr})] + V_{cax}(t)U_{axn}(t) + \\ & V_{cqx}(t)U_{qxn}(t) + V_{crx}(t)U_{rxn}(t) \end{aligned}$$

$$\begin{aligned} V_{yp}(t) = & \; G_{yp}(y)[V_{mxr}(t)\sin 2\theta_r \cos(\omega_{xr} t + \psi_{xr}) + \\ & V_{myr}(t)\cos 2\theta_r \cos(\omega_{yr} t + \psi_{yr})] + V_{cay}(t)U_{ayp}(t) + \\ & V_{cqy}(t)U_{qyp}(t) + V_{cry}(t)U_{ryp}(t) \end{aligned}$$

$$\begin{aligned} V_{yn}(t) = & -G_{yn}(y)[V_{mxr}(t)\sin 2\theta_r \cos(\omega_{xr} t + \psi_{xr}) - \\ & V_{myr}(t)\cos 2\theta_r \cos(\omega_{yr} t + \psi_{yr})] + V_{cay}(t)U_{ayn}(t) + \\ & V_{cqy}(t)U_{qyn}(t) + V_{cry}(t)U_{ryn}(t) \end{aligned}$$

Figure 3:
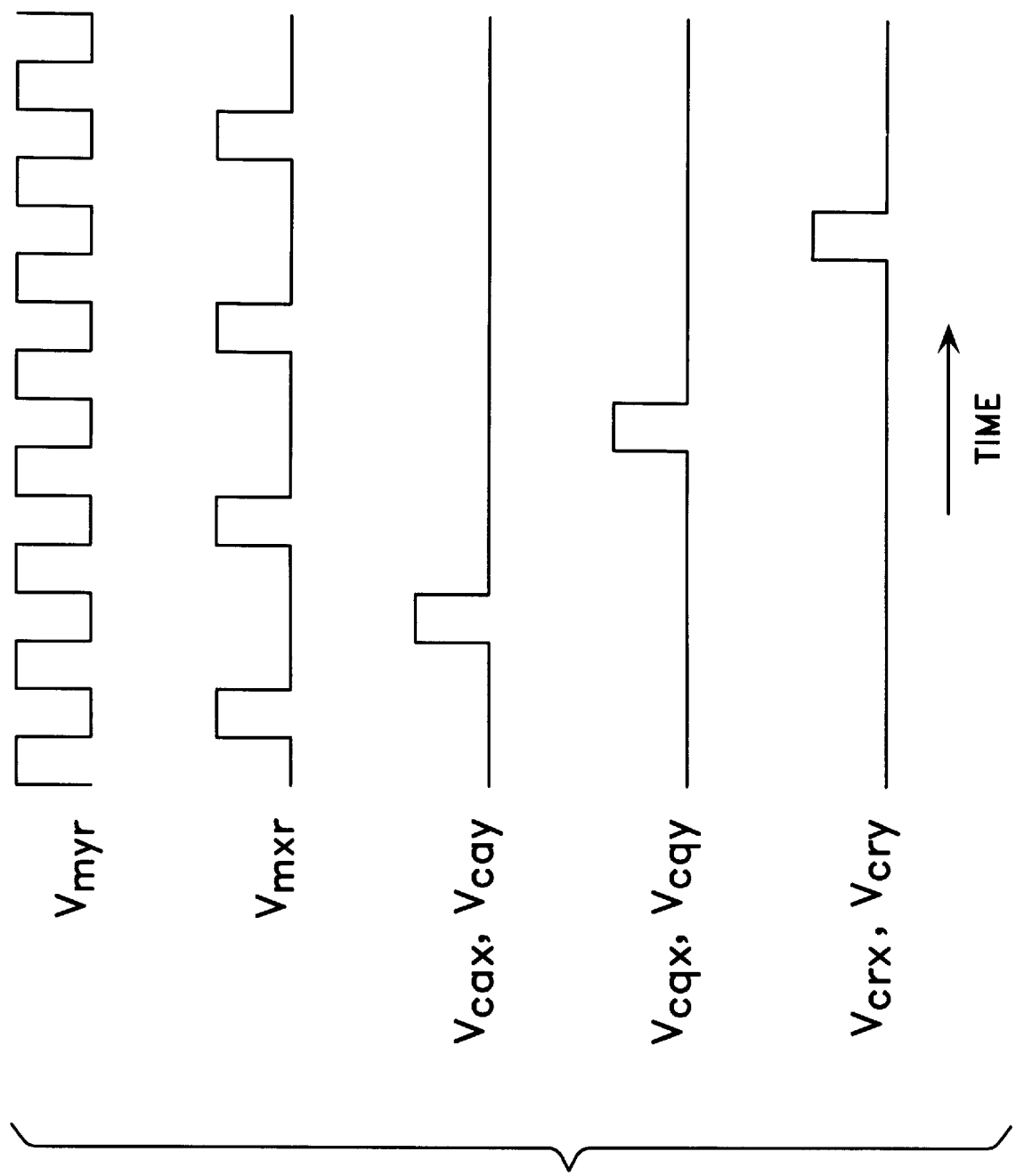
FIG. 3 shows the multiplex control signals for a particular embodiment of the invention.

One possible time-division-multiplex configuration is a sixteen-slot frame of duration $32\pi/\omega$ synchronized to the flexure rate of the resonator. The multiplex control voltages are as shown in FIG. 3. When $\theta_r$ equals $\theta$, the $x_r$ axes coincide with the antinodal axes and the $y_r$ axes coincide with the nodal axes. Eight slots are assigned to reading out the $y_r$ signal component, 4 slots to reading out the $x_r$ signal component, and 1 slot each to applying amplitude, quadrature, and rate forces to the resonator. For a vibration frequency of 4 kHz, readouts of the $x_r$ and $y_r$ signal components would be available at a rate of 2 kHz and 1 kHz respectively. The control voltages would be applied at a rate of 0.25 kHz.

In general, the signals $S_x(t)$ and $S_y(t)$ exiting from the amplifier-demultiplexer 44 have the form $$S_x(t) = K_{Vx} R_x(t)$$

$$S_y(t) = K_{Vy} R_y(t) \quad (27)$$

where $K_{Vx}$ and $K_{Vy}$ each equals $K_V$ except in the case of time-division multiplexing when $K_{Vx}$ equals $K_V V_{mx}(t)$ and $K_{Vy}$ equals $K_V V_{my}(t)$.

In order to extract the standing-wave parameters from the signals $S_x(t)$ and $S_y(t)$, a stable and precise replica of the resonator vibration signal cos ($\omega t+\phi$) is required. The replica is obtained from a voltage-controlled oscillator in replica generator 52 wherein the voltage-controlled oscillator is phase-locked to the in-phase standing-wave antinodal signal. The first step of the process is to multiply $S_x(t)$ and $S_y(t)$ first by the replica signal cos ($\omega_r t+\phi_r$) and lowpass filter the results and then by the phase-shifted replica sin ($\omega_r t+\phi_r$) and lowpass filter the results. The results of this process are:

$$\begin{aligned} S_{ix}(t) = & \; K \{d_i \cos(2\theta - 2\theta_r)\cos[(\omega_r - \omega)t + (\phi_r - \phi)] + \\ & d_q \sin(2\theta - 2\theta_r)\sin[(\omega_r - \omega)t + (\phi_r - \phi)]\} \end{aligned} \quad (28)$$

-continued $$S_{iy}(t) = K \{d_i\sin(2\theta - 2\theta_r)\cos[(\omega_r - \omega)t + (\phi_r - \phi)] - d_q\cos(2\theta - 2\theta_r)\sin[(\omega_r - \omega)t + (\phi_r - \phi)]\}$$

$$S_{qx}(t) = K \{d_i\cos(2\theta - 2\theta_r)\sin[(\omega_r - \omega)t + (\phi_r - \phi)] - d_q\sin(2\theta - 2\theta_r)\cos[(\omega_r - \omega)t + (\phi_r - \phi)]\}$$

$$S_{qy}(t) = K \{d_i\sin(2\theta - 2\theta_r)\sin[(\omega_r - \omega)t + (\phi_r - \phi)] + d_q\cos(2\theta - 2\theta_r)\cos[(\omega_r - \omega)t + (\phi_r - \phi)]\}$$

where K is a constant.

The next step is to form the following combinations of products of the $S_{ix}(t)$, $S_{iy}(t)$, $S_{qx}(t)$, and $S_{qy}(t)$:

$$E = S_{ix}^2 + S_{qx}^2 + S_{iy}^2 + S_{qy}^2 = K^2(d_i^2 + d_q^2) \quad (29)$$

$$Q = 2(S_{ix}S_{qy} - S_{iy}S_{qx}) = K^2(2d_id_q)$$

$$R = S_{ix}^2 + S_{qx}^2 - S_{iy}^2 - S_{qy}^2 = K^2(d_i^2 - d_q^2)\cos(4\theta - 4\theta_r)$$

$$S = 2(S_{ix}S_{iy} + S_{qx}S_{qy}) = K^2(d_i^2 - d_q^2)\sin(4\theta - 4\theta_r)$$

$$L_i = 2(S_{ix}S_{qx} + S_{iy}S_{qy}) = K^2(d_i^2 - d_q^2)\sin[2(\omega_r - \omega)t + 2(\phi_r - \phi)]$$

With $L_i(t)$ as the error signal, the phase-locked loop will lock up with the replica phase $\phi_r$ equal to $\phi$ and $\omega_r$ equal to $\omega$.

The difference between the standing-wave orientation angle and the tracking angle $\theta-\theta_r$, can be determined from the equation $$\tan(4\theta - 4\theta_r) = \frac{S(t)}{R(t)} \quad (30)$$

and the signs of $S_{ix}(t)$ and $S_{iy}(t)$. The quantity $S(t)$ can be used as the error signal in a control loop which generates $\theta_r$ and causes on average $\theta$ to equal $\theta_r$ and $d/dt(\theta-\theta_r)$ to equal 0. The digitally-synthesized tracking angle $\theta_r$ is used in generating $\sin 2\theta_r$ and $\cos 2\theta_r$ which are supplied to the multiplexer 48. With $\phi_r$ equal to $\phi$, $\omega_r$ equal to $\omega$, and $\theta_r$ equal to $\theta$, the quantities $d_i$ and $d_q$ can be determined from the first and fourth of equations 28.

The actual value of $\theta$ at any given time is given by $$\theta = \theta_r + \frac{1}{4}\tan^{-1}\frac{S(t)}{R(t)} \approx \theta_r + \frac{1}{4}\frac{S(t)}{R(t)} \quad (31)$$

The difference between E(t) and a specified number is used as the error signal in the amplitude control loop which causes the total energy in the combined inphase and quadrature standing waves, which is proportional to $d_i^2+d_q^2$, to equal the specified number.

The quantity Q(t) is used as the error signal in the quadrature control loop which results in the quadrature standing-wave amplitude $d_q$ to be zero. When this loop is closed, the amplitude control loop maintains the inphase amplitude $d_i$ at a specified value.

The use of the above control variables can be shown to be optimum. It will be apparent to those skilled in the art that there are many choices of control variables that are suboptimum but still practical.

The outputs of the control unit 50 are the functions $U_{xp}(t)$, $U_{xn}(t)$, $U_{yp}(t)$, and $U_{yn}(t)$ together with $d_i$, $d_q$, the sine and cosine of $\omega_r t+\phi_r$, and the sine and cosine of $2\theta_r$, which are all supplied to multiplexer 48.

Additional details concerning vibratory rotation sensors are contained in U.S. Pat. No. 4,951,508 by Loper, Jr. et al. dated Aug. 28, 1990 which is incorporated by reference.

What is claimed is:

1. A method for obtaining linear measures of one or more parameters $p_m$ of a device having one or more input ports i and an output port, m taking on integer values from 1 to M, M being an integer equal to or greater than 1, i taking on integer values from 1 to I, I being an integer equal to or greater than 1, the device causing one or more input signals $G_i(p_m)E_{ei}(t)$ fed into one or more input ports to be transformed into an output signal comprising a summation over i of $G_i(p_m)H_i(p_m)E_{oi}(t)$ at the output port, $G_i(p_m)$ being a weighting function associated with the i'th input port, $E_{ei}(t)$ being an excitation signal associated with the i'th input port, $E_{oi}(t)$ being the transformation of the excitation signal $E_{ei}(t)$ that results from $E_{ei}(t)$ traversing the path from the input port i to the output port, $E_{ei}(t)$ and $E_{oi}(t)$ being independent of the parameter $p_m$, the product function $G_i(p_m)H_i(p_m)$ being representable by a power series of order $N_{im}$ in $p_m$, the value of $N_{im}$ depending on a specified accuracy of representation, the method comprising the steps:

generating one or more linearizing weighting functions $G_{il}(p_m)$ for which the output signal is a linear measure of the parameter $p_m$ to the specified accuracy of representation;

feeding the input signals $G_{il}(p_m)E_{ei}(t)$ into the device;

using a component of the output signal as a linear measure of each of the one or more parameters $p_m$.

2. The method of claim 1 wherein $G_{il}(p_m)H_i(p_m)$ is equal to $A_{im}p_m$ where $A_{im}$ is an arbitrary constant.

3. The method of claim 1 wherein the device is a vibratory rotation sensor comprising a resonator with attached resonator electrode and a housing with a plurality of attached housing electrodes, each of the housing electrodes being an input port and the resonator electrode being the output port, the linearizing weighting function associated with a particular port i being $G_{il}(z_i)$, the quantity $(1+z_i)$ being the distance between the resonator electrode and the i'th housing electrode in units of the distance between the same electrodes when the resonator is not vibrating.

4. The method of claim 3 wherein the linearizing weighting function $G_{il}(z_i)$ associated with a particular port i is proportional to $z_i(1+z_i)$.

5. The method of claim 3 wherein the linearizing weighting function $G_{il}(z_i)$ associated with a particular port i is proportional to $(1-z_i)(1+z_i)$.

6. The method of claim 3 wherein $z_i$ is calculated from the maximum flexing amplitudes $d_i$ and $d_q$ of the inphase and quadrature vibration modes respectively expressed in the same units as $z_i$, the angle $\theta$ between the antinodal axis of the inphase standing wave with respect to the $z_i$ electrode position, the angular frequency of vibration $\omega$ of the resonator, and the phase angle $\phi$ associated with the vibration of the resonator, estimates of $d_i$, $d_q$, $\theta$, $\omega$, and $\phi$ being provided by the vibratory rotation sensor.

7. The method of claim 6 wherein the value of the maximum quadrature flexing amplitude $d_q$ is set equal to zero in calculating $z_i$.

8. The method of claim 7 wherein $\cos(\omega t+\phi)$ is approximated by a constant $\gamma$ in calculating $z_i$.

* * * * *